No. 722,812. PATENTED MAR. 17, 1903.
W. B. COGSWELL.
DEVICE FOR FEEDING ASH INTO GLASS FURNACES.
APPLICATION FILED SEPT. 20, 1900.
NO MODEL.
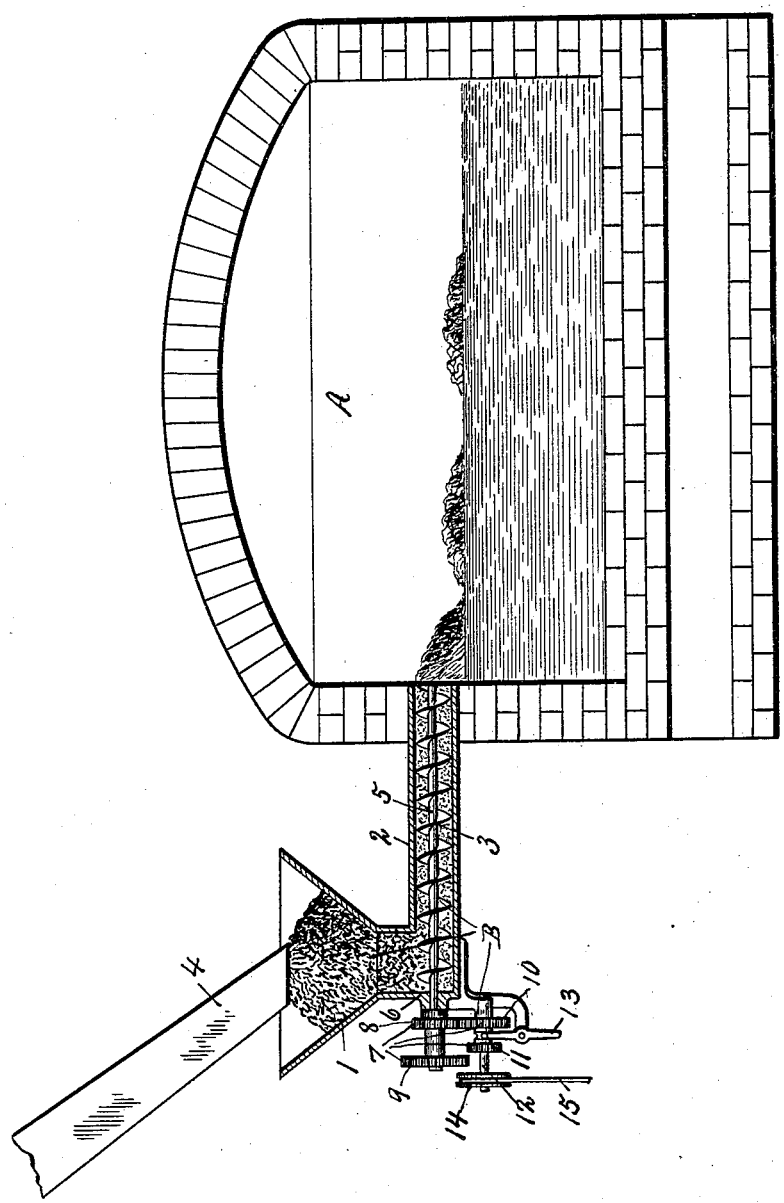
WITNESSES.
J. E. Arthur
E. K. Benson.
INVENTOR
WM. B. COGSWELL.
BY
Smith & Denison
ATTORNEYS.

UNITED STATES PATENT OFFICE.

WILLIAM B. COGSWELL, OF SYRACUSE, NEW YORK.

DEVICE FOR FEEDING ASH INTO GLASS-FURNACES.

SPECIFICATION forming part of Letters Patent No. 722,812, dated March 17, 1903.

Application filed September 20, 1900. Serial No. 30,534. (No model.)

*To all whom it may concern:*

Be it known that I, WILLIAM B. COGSWELL, of Syracuse, in the county of Onondaga, in the State of New York, have invented new and useful Improvements in Devices for Feeding Ash into Regenerative Glass-Furnaces, of which the following, taken in connection with the accompanying drawing, is a full, clear, and exact description.

This invention relates to devices for feeding ash into the tank of glass-furnaces. It has heretofore been customary to throw the ash or batch into the tank containing the molten glass through a convenient opening especially provided for this purpose, with the result that when the ash or batch comes in contact with the hot glass within the tank it would be scattered and would fly in all directions, resulting not only in the loss of soda, but in the destruction of the "checker-work" used in the regenerative heater.

My object, therefore, is to provide means for feeding or adding to the volatile mass the ash in such quantities and at such rate of speed as is best adapted to produce the best results in the most economical manner, thereby making the glass more uniform, and consequently of a better grade.

While I shall describe this device as applicable to feeding ash into the regenerative tank, I do not desire to limit myself to the use for this special purpose, as it will be evident that it may be used for various purposes of a similar character; and to that end my invention consists in the several new and novel features of construction and operation which are hereinafter described, and specifically set forth in the claim hereunto annexed. It is constructed as follows, reference being had to the accompanying drawing, in which I show a portion in section of a regenerative furnace provided with my improved device for feeding the ash into the tank.

Similar characters indicate corresponding parts.

A is a regenerative furnace or tank, and B is the device for feeding the ash into the tank. This feeding device preferably consists of a hopper 1, a conduit 2, leading from the hopper to the interior of the furnace, and a screw 3, arranged within the conduit 2 between the hopper and the discharge end of the conduit. The hopper 1 serves to receive the ash, which may be fed thereto in any desired manner and preferably by a chute 4, leading from any convenient locality, or means for supplying the ash in necessary quantities. The conduit 2 serves to conduct the ash from the hopper 1 and is usually arranged to discharge upon the surface of the glass mixture in proximity to one of its inclosing walls. The screw 3 may be rotated in any desired manner for forcing the ash from the hopper through the discharge end of the conduit 2 and is preferably mounted on a shaft 5, having its outer end extended through an end wall 6 of the conduit 2 and provided with a variable-speed driving mechanism 7 for rotating and regulating the speed of movement of the screw, and thereby feeding the desired quantity of ash or other ingredient to the surface of the glass mixture within the regenerator. As seen in the drawing, this driving mechanism consists of gears 8 and 9, secured to the shaft 5 and formed of unequal diameter, and gears 10 and 11, which are splined on a shaft 12, moved lengthwise thereof by a suitable lever 13 in a manner well known, said shaft 12 being provided with a pulley 14, connected by a belt 15 to any source of power. (Not illustrated.) The gear 10 is movable into and out of engagement with the gear 8 and formed of greater diameter than the gear 8 for transmitting increased speed thereto, and the gear 11 being movable into and out of mesh with the gear 9 and formed of less diameter than said gear 9 for transmitting decreased speed to the screw.

The operation of my invention will now be readily understood upon reference to the foregoing description and the accompanying drawing, and it will be noted that the detail construction of the feed and driving mechanism may be considerably varied without departing from the spirit of this invention, the essential feature being to provide a feeding mechanism movable at variable rates of speed for feeding the ash to the surface of a mass of glass mixture.

Having thus fully described my invention, what I claim as new, and desire to secure by Letters Patent, is—

In a regenerative glass-furnace, the combination of a tank, a conduit extending horizontally through the wall of the tank the inner end thereof being flush with the inner wall of the tank, said conduit having an upwardly-extending portion at its outer end, a hopper secured therein, a bearing formed in the conduit at the base of the upwardly-extending portion, a shaft journaled therein and extending through said conduit to its inner end, a portion of said shaft extending outwardly from the bearing, a screw conveyer surrounding said shaft supporting the inner end thereof and in engagement with the inner walls of said conduit, gears of differential diameters rigidly secured to the outer end of said shaft, a bracket secured to the under side of the conduit, said bracket having downwardly and outwardly extending portions, a driving-pulley secured to the shaft, differential gears slidably mounted on said shaft, and a lever pivoted to the lower portion of the bracket, said lever connected to the differential gears on the last-named shaft and secured between the same, adapted to shift each one of the same into and out of engagement with the first-named gears, substantially as described.

In witness whereof I have hereunto set my hand this 13th day of September, 1900.

W. B. COGSWELL.

Witnesses:
HOWARD P. DENISON,
MILDRED M. NOTT.